United States Patent [19]
Baloche et al.

[11] Patent Number: 5,984,254
[45] Date of Patent: Nov. 16, 1999

[54] SLIDEWAY FOR A VEHICLE SEAT, AND A SEAT FITTED WITH SUCH A SLIDEWAY

[75] Inventors: François Baloche; René Rohee, both of Flers, France

[73] Assignee: Bertrand Faure Equipements SA, Boulogne, France

[21] Appl. No.: 08/967,815

[22] Filed: Nov. 12, 1997

[30] Foreign Application Priority Data

Nov. 14, 1996 [FR] France .................................. 96 13881

[51] Int. Cl.⁶ .................................................. A47C 1/023
[52] U.S. Cl. ...................... 248/430; 248/903; 296/65.14; 384/47; 297/311; 297/344.1
[58] Field of Search .................... 248/430, 429, 248/903; 296/65.13, 65.14, 68.1; 384/47, 34, 18; 297/311, 344.1, 344.11

[56] References Cited

U.S. PATENT DOCUMENTS

| | | |
|---|---|---|
| 3,926,397 | 12/1975 | Hunwicks ................................ 248/430 |
| 5,522,665 | 6/1996 | Baloche et al. ........................... 384/47 |

FOREIGN PATENT DOCUMENTS

| | | |
|---|---|---|
| 0 753 425 A1 | 1/1997 | European Pat. Off. . |
| 2 380 462 | 9/1978 | France . |
| 2 390 625 | 12/1978 | France . |
| 2 717 749 | 9/1995 | France . |
| 2 736 596 | 7/1997 | France . |
| 24 37 499 | 3/1975 | Germany . |
| 26 05 997 | 8/1977 | Germany . |
| 30 30 725 A1 | 3/1982 | Germany . |
| 41 33 509 A1 | 4/1993 | Germany . |
| 1 573 896 | 8/1980 | United Kingdom . |

OTHER PUBLICATIONS

French Preliminary Search Report dated Jul. 30, 1997, French Application FR 9613881 filed Nov. 14, 1996.

*Primary Examiner*—Leslie A. Braun
*Assistant Examiner*—Stephen S. Wentsler
*Attorney, Agent, or Firm*—Marshall, O'Toole, Gerstein, Murray & Borun

[57] ABSTRACT

A vehicle seat slideway has a male channel member whose two flanges are outwardly extended by flaps extending at an angle outwards and towards the web of the male channel member to a vertical end portion, and a female channel member having flanges extended by reentrant troughs penetrating between the flanges and the flaps of the male channel member. Same-diameter balls are disposed firstly between each flap and the corresponding reentrant trough, bearing against at least the vertical end portion of the flap and against a sloping flat portion which extends an initial horizontal portion of the reentrant trough, and secondly against the flap and a corner zone situated at the junction between the web and the corresponding flange of the female channel member.

10 Claims, 1 Drawing Sheet

SLIDEWAY FOR A VEHICLE SEAT, AND A SEAT FITTED WITH SUCH A SLIDEWAY

FIELD OF THE INVENTION

The present relates to a slideway for vehicle seats, and to seats fitted with such slideways.

The slideways in question are designed in particular to be fitted to the front seats of motor vehicles for the purpose of adjusting such seats in longitudinal position.

More particularly, the invention relates to a slideway for a vehicle seat, the slideway comprising a "female" section member, a "male" section member engaged in the female section member in such a manner as to leave four longitudinal ball races between the two section members and groups of balls received in said races to enable relative longitudinal sliding between the two section members, the right section of the male section member being generally in the form of a narrow channel comprising, firstly, a substantially horizontal web and secondly two flanges each extending substantially vertically from the web to an end edge, said end edge being extended outwardly by flaps each having a vertical end portion, the right section of the female section member being generally in the form of a wide channel and comprising, firstly a substantially horizontal web adjacent the end edges of the flanges of the male section member, and secondly two flanges each extending substantially vertically in the opposite direction to the two flanges of the male section member from the web of the female section member to respective end edges, thereby enveloping the male section member, the end edge of each of the flanges of the female section member being extended inwards by a reentrant trough comprising a horizontal length extending from the end edge of the corresponding flange of the female section member, said horizontal length itself being extended by a reentrant wall disposed between the corresponding flange and flap of the male section member, said reentrant wall comprising a sloping length which extends at an angle towards the corresponding flange of the male section member and towards the end edge of said flange, said sloping length co-operating with the corresponding flap of the male section member to define a first ball race such that the balls of this ball race are in contact with said sloping length and with said flap, whereas said flap also co-operates with a corner zone situated at the junction between the web of the female section member and the corresponding flange of said female section member to define a second ball race in such a manner that the balls in the second ball race are in contact with said flap and with said corner zone.

BACKGROUND OF THE INVENTION

Document FR-A-2 717 749 discloses such a slideway.

However, under certain conditions, the slideway described in that document can be subject to jamming, particularly when a compression or traction load is applied to the slideway.

OBJECT AND SUMMARY OF THE INVENTION

A particular object of the present invention is to mitigate that drawback.

To this end, according to the invention, in a slideway of the kind in question:

the balls of each first ball race press against the vertical end portion of the corresponding flap of the male section member; and the sloping length of each reentrant trough of the female section member directly extends the horizontal length of said reentrant trough, the sloping length having a right section that is rectilinear in shape.

By means of these dispositions, the compression loads applied vertically between the two section members give rise to elastic bending of the male section member flaps and of the sloping lengths of the reentrant troughs, thereby avoiding any jamming of the balls, but without thereby creating any slack that would rattle.

Similarly, traction applied vertically between the two section members gives rise to resilient bending that avoids jamming the balls of the first ball races.

Compared with the slideway described in the above-mentioned document, the bending of the reentrant troughs of the slideway of the invention is facilitated in particular by the absence of vertical intermediate lengths between the horizontal lengths and the sloping lengths of the reentrant troughs, given that such vertical lengths form ribs that are relatively strong against vertical deformation.

In addition, in the slideway of the invention, jamming is also avoided because, compared with the slideway described in the above-mentioned document, the sloping lengths of the reentrant troughs no longer fit over even a portion of the outside shape of the said balls.

In all cases, the invention makes it possible to reduce considerably and even to eliminate any permanent slack between the two section members and the balls, thereby making it possible simultaneously to achieve highly effective guidance in sliding and also to avoid rattling while the vehicle is running, with this being achieved without jamming.

In preferred embodiments, use may also optionally be made of one or more of the following dispositions:

each flap belonging to the male section member has a horizontal length which extends the end edge of the corresponding flange of said male section member, followed by a curved length which extends at an angle towards the corresponding flange of the female section member and towards the end edge of said flange, said curved length being extended by the vertical end portion of the flap, said curved length having a concave face which forms a gutter facing the corner zone situated at the junction between the web of the female section member and the corresponding flange of said section member, said gutter receiving the balls of the corresponding section ball race, the curved length of the above-mentioned flap also having a convex face disposed facing the corresponding reentrant trough of the female section member, each of the balls of the first ball race having at least one point of contact with said convex face;

each ball of each second ball race presents at least one point of contact with the corresponding vertical flange of the female section member, and at least one point of contact with a horizontal wall belonging to the web of said female section member;

the sloping length of each reentrant trough is extended towards the end edge of the corresponding flange of the male section member by a vertical length which is disposed in the immediate vicinity of said flange;

the balls of the first ball race are closer to the vertical length of the corresponding reentrant trough than to the horizontal length of said reentrant trough, the balls nevertheless not coming into contact with said vertical length;

the male section member is secured to a reinforcing section member likewise having a right section that is generally channel-shaped, said reinforcing section member comprising a substantially horizontal web secured to the web of the male section member, two flanges which extend substantially vertically from said web on either side of the flanges of the female section member, and two substantially horizontal lips each of which is engaged beneath a portion of the web of the female section member;

the web of the female section member has a horizontal central portion between two lateral jutting strips beneath which the respective lips of the reinforcing section member penetrate; and the web of the reinforcing section member has two longitudinal folds forming two ribs each penetrating in part between one of the flanges of the male section member and the corresponding reentrant trough of the female section member.

The invention also provides a vehicle seat in which the seat proper is mounted on two slideways as defined above. In particular, when the seat further includes a seat belt having at least one fixing point secured to the seat, it is advantageous for the slideways to include a reinforcing section member as defined above.

BRIEF DESCRIPTION OF THE DRAWINGS

Other characteristics and advantages of the invention appear from the following detailed description of embodiments thereof given as non-limiting examples, and with reference to the accompanying drawing.

In the drawing.

MORE DETAILED DESCRIPTION

In the various figures, the same references designate elements that are identical or similar.

Figure 1:
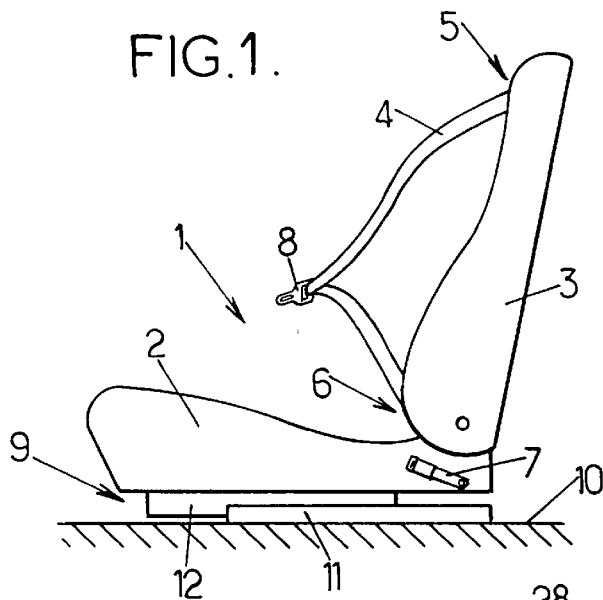
FIG. 1 is a diagrammatic view of a vehicle seat suitable for fitting with slideways of the invention.

FIG. 1 shows a front seat 1 of a motor vehicle, which seat has a seat proper 2 and a back 3 mounted on the seat proper.

In addition, in some cases, the seat 1 can include a seat belt 4 of the "seat-mounted" kind, i.e. having at least one of its three fixing points secured to the seat.

In the particular case shown in FIG. 1, the seat belt 4 is connected to the seat 1 via three fixing points, namely:

a top fixing point 5 which is generally constituted by a belt winder integrated in the back 3;

a permanent bottom fixing point 6 situated on one side of the seat proper 2; and a releasable fixing point 7 situated on the other side of the seat proper 2 and constituted more particularly by a belt locking system which co-operates with a buckle 8 that is slidable along the seat belt 4.

The seat proper 2 is mounted on the floor 10 of the vehicle via two longitudinal slideways 9, only one of which is visible in FIG. 1.

Each of the slideways comprises firstly a fixed section member 11 which is fixed to the floor 10, and secondly a moving section member 12 which is fixed to the seat proper 2. The moving section member 12 slides longitudinally on the fixed section member 11 and is capable of being coupled to the fixed section member by means of a manual locking mechanism or by means of a motor driven adjustment mechanism, both of which means are known per se.

One of the two section members 11 and 12 is a male section member which is engaged inside the other section member, referred to as a female section member. In the two embodiments of the invention described below, the male section member is constituted by the top, moving section member 12 while the female section member is constituted by the bottom, stationary section member 11, however this disposition could naturally be inverted without going beyond the ambit of the invention, in which case the female section member 11 would be the top, moving section member and the male section member 12 would be the bottom, stationary section member.

In all situations, each of the two sections 11 and 12 is constituted by folded metal sheet obtained by any known method, e.g. stamping, profiling, or extrusion.

In addition, the section members are of substantially constant right section along their entire length, with exception being made, naturally, for gaps, cutouts, teeth, or other fixing or locking means which may be provided in said section members or added to said section members.

Figure 2:
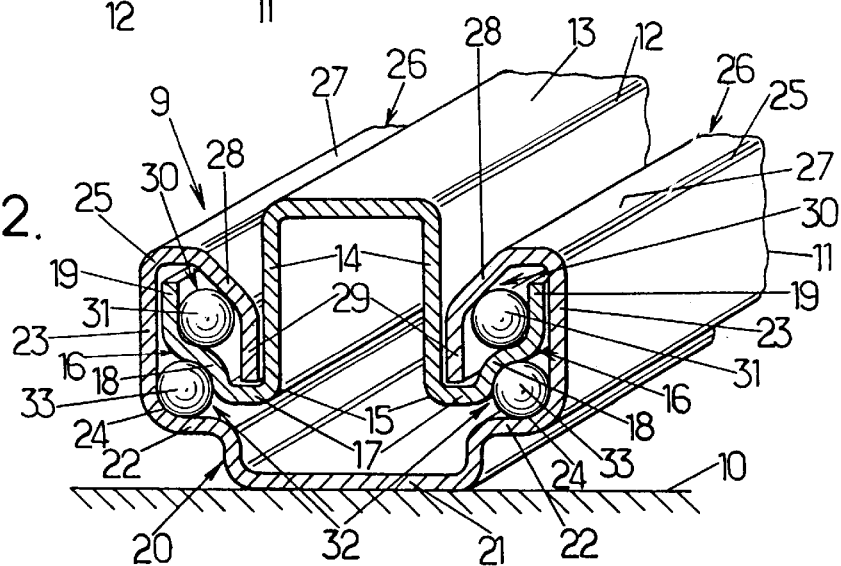
FIG. 2 is a view in perspective and in cross-section of a slideway constituting an embodiment of the invention.

In the embodiment of FIG. 2, the male section member 12 has a right section that is generally in the form of a narrow channel and which comprises:

a flat horizontal web 13 which is fixed to the strength member of the seat 2;

two vertical flanges 14, each of which extends downwards from the web 13 to a bottom end edge 15; and two flaps 16, each of which extends outwards and upwards from the bottom end edge 15.

Starting from the end edge 15, each of the flaps 16 presents:

a short horizontal length 17;

a curved length 18 having a concave bottom face at an angle of about 45°, looking downwards and outwards, thereby forming a longitudinal gutter, together with a corresponding convex top face; and a vertical end portion 19.

The female section member 11 comprises:

a horizontal web 20 comprises firstly a flat horizontal central portion 21 fixed to the floor 10 of the vehicle, and secondly two substantially horizontal lateral jutting strips 22 which are disposed a little above the floor 10;

two vertical flanges 23 which extend upwards from the two jutting strips 22 and which co-operate therewith to define two rounded corners 24 disposed facing the concave bottom faces of the above-mentioned curves lengths 18, with each of the two flanges 23 extending to a top end edge 25; and two reentrant troughs 26 extending the top end edges 25 inwards and downwards, and penetrating between the flanges 14 and the flaps 16 of the male section member.

Starting from its end edge 25, each reentrant trough 26 comprises:

firstly a short horizontal length 27 disposed a short distance above the vertical end portion 19 of the corresponding flap 16;

then a sloping length 28 of rectilinear section which extends inwards and downwards, e.g. at an angle of substantially 45°; and finally a vertical length 29 disposed in the immediate vicinity of the corresponding flange 14 of the male section member and extending to the vicinity of the horizontal length 17 of the corresponding flap.

Between them, the two section members 11 and 12 define four ball races, namely:

firstly two first ball races 30 each defined between a reentrant trough 26 and the corresponding flap 16 and each containing a group of rigid balls 31 made of metal or of plastic; and secondly two second ball races 32 each defined between a flap 16 and the corresponding corner zone 24 and each containing a group of rigid balls 33, in particular metal balls, these balls 33 being identical or substantially identical to the balls 31.

Each of the balls 31 of the first ball race is in contact:

with a point of the sloping length 28 of the corresponding reentrant trough, the ball 31 being closer to the vertical length 29 than to the horizontal length 27, but said ball 31 nevertheless being kept away from the vertical length 29;

with a point on the vertical end portion 19 of the corresponding flap 16; and with a point on the convex face of the curved length 18 of the flap, said curved length connecting with the vertical end portion 19 via a radius of curvature that is smaller than the radius of the balls 31.

In addition, each ball 33 of each second ball race is in contact:

with the concave face of the curved length 18 of the corresponding flap, the balls 33 thus being in contact with said concave face along at least one bearing line situated in the immediate vicinity of the bearing line of the corresponding balls 31 on the convex face of the same curved length 18;

with at least one point on the corresponding vertical flange 23, with thrust taking place in a horizontal direction; and with at least one point on the corresponding jutting strip 22, with thrust taking place in a vertical direction, the corner zone 24 having a radius of curvature that is smaller than or equal to the radius of the balls 33.

The balls 33 are thus accurately guided, given the relatively great strength of the corner zones 24.

Because of these dispositions, the slideway is very strong against vertical forces, both in compression and in traction, and the slideway is not liable to jamming because of the elastic bending of the flaps 16 and above all of the reentrant troughs 26.

In addition, in order to further increase the strength of the slideway of the invention against vertical traction forces, in particular when the seat 1 mounted on such slideways carries and "seat-mounted" seat belt it may be advantageous to add a metal reinforcing section member 34 to the slideway, with the remainder of the slideway being unchanged relative to that described above.

Figure 3:
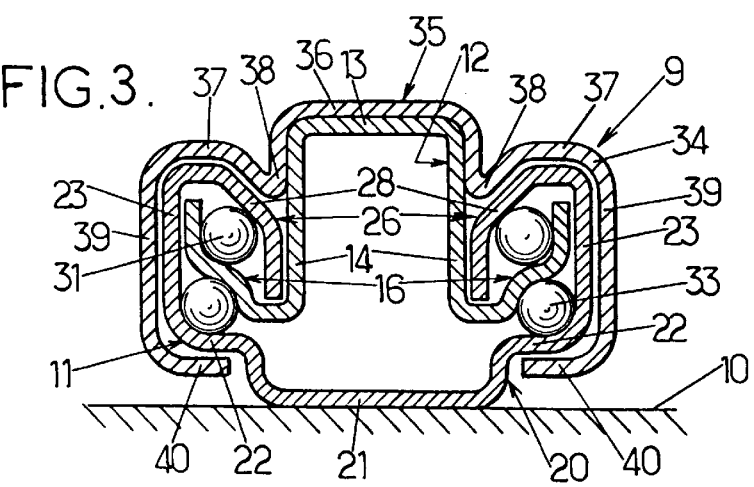
FIG. 3 is a cross-section view through a slideway similar to that of FIG. 2, and provided with a reinforcing section member.

As shown in FIG. 3, the reinforcing section member 34 is generally channel-shaped, having a right section that comprises:

a substantially horizontal web 35 which is secured to the web of the male section member by any known means (bolts, welding, etc.), said web having a central portion 36 disposed in contact with the web 13 of the male section member and two lateral portions 37 disposed with a small amount of clearance above the reentrant troughs 26 of the female section member, the central portion 36 being connected to the lateral portions 37 via respective lateral folds 38 forming two V-shaped ribs penetrating into the reentrant troughs and the flanges 14 of the male section member, sad ribs coming into contact with said flanges 14 and being separated from the sloping lengths 28 of the reentrant troughs by a small amount of clearance;

two vertical flanges 39 which extend the lateral portions 37 of the web 36 downwards on either side of the female section member 11; and two horizontal lips 40, each penetrating beneath a respective jutting strip 22 of the web of the female section member.

We claim:

1. A slideway for a vehicle seat, the slideway comprising a "female" section member, a "male" section member engaged in the female section member in such a manner as to leave four longitudinal ball races between the two section members and groups of each of the balls being received in one of said races to enable relative longitudinal sliding between the two section members, the male section member being generally in the form of a narrow channel comprising, firstly, a substantially horizontal web and secondly two flanges each extending substantially vertically from the web to an end edge, said end edge of the flanges of the male section member being extended outwardly by flaps each having a vertical end portion, the female section member being generally in the form of a wide channel and comprising, firstly a substantially horizontal web adjacent the end edges of the flanges of the male section member, and secondly two flanges each extending substantially vertically in the opposite direction to the two flanges of the male section member from the web of the female section member to respective end edges, thereby enveloping the male section member, the end edge of each of the flanges of the female section member being extended inwards by a reentrant trough comprising a horizontal length extending from the end edge of the corresponding flange of the female section member, said horizontal length itself being extended by a reentrant wall disposed between the corresponding flange and flap of the male section member, said reentrant wall comprising a sloping length which extends at an angle towards the corresponding flange of the male section member and towards the end edge of said flange, said sloping length co-operating with the corresponding flap of the male section member to define a first ball race such that the balls of this ball race are in contact with said sloping length and with said flap of the male section member, whereas said flap of the male section member also co-operates with a corner zone situated at the junction between the web of the female section member and the corresponding flange of said female section member to define a second ball race in such a manner that the balls in the second ball race are in contact with said flap of the male section member and with said corner zone, wherein the balls of each first ball race press against the vertical end portion of the corresponding flap of the male section member, the sloping length of each reentrant trough of the female section member directly extending the horizontal length of said reentrant trough, the sloping length being planar.

2. A slideway according to claim 1, in which each flap belonging to the male section member has a horizontal length which extends the end edge of the corresponding flange of said male section member, followed by a curved length which extends at an angle towards the corresponding flange of the female section member and towards the end edge of said flange of the female section member, said curved length being extended by the vertical end portion of the flap, said curved length having a concave face which forms a gutter facing the corner zone situated at the junction between the web of the female section member and the corresponding flange of said female section member, said gutter receiving the balls of the corresponding second ball race, the curved length of the above-mentioned flap also having a convex face disposed facing the corresponding reentrant trough of the female section member, each of the balls of the first ball race having at least one point of contact with said convex face.

3. A slideway according to claim 1, in which each ball of each second ball race presents at least one point of contact with the corresponding vertical flange of the female section member, and at least one point of contact with a horizontal wall belonging to the web of said female section member.

4. A slideway according to claim 1, in which the sloping length of each reentrant trough is extended towards the end edge of the corresponding flange of the male section member by a vertical length which is disposed in the immediate vicinity of said flange of the male section member.

5. A slideway according to claim 4, in which the balls of the first ball race are closer to the vertical length of the corresponding reentrant trough than to the horizontal length of said reentrant trough, the balls nevertheless not coming into contact with said vertical length of said corresponding reentrant trough.

6. A slideway according to claim 1, in which the male section member is secured to a reinforcing section member likewise being generally channel-shaped, said reinforcing section member comprising a substantially horizontal web secured to the web of the male section member, two flanges which extend substantially vertically from said web on either side of the flanges of the female section member, and two substantially horizontal lips each of which is situated beneath a portion of the web of the female section member.

7. A slideway according to claim 6, in which the web of the female section member has a horizontal central portion between two lateral jutting strips beneath which are situated the respective lips of the reinforcing section member.

8. A slideway according to claim 6, in which the web of the reinforcing section member has two longitudinal folds forming two ribs each penetrating in part between one of the flanges of the male section member and the corresponding reentrant trough of the female section member.

9. A combination of a vehicle seat and two slideways, the seat mounted on the two slideways, each slideway comprising a "female" section member, a "male" section member engaged in the female section member in such a manner as to leave four longitudinal ball races between the two section members and groups of each of the balls being received in one of said races to enable relative longitudinal sliding between the two section members, the male section member being generally in the form of a narrow channel comprising, firstly, a substantially horizontal web and secondly two flanges each extending substantially vertically from the web to an end edge, said end edge of the flanges of the male section member being extended outwardly by flaps each having a vertical end portion, the female section member being generally in the form of a wide channel and comprising, firstly a substantially horizontal web adjacent the end edges of the flanges of the male section member, and secondly two flanges each extending substantially vertically in the opposite direction to the two flanges of the male section member from the web of the female section member to respective end edges, thereby enveloping the male section member, the end edge of each of the flanges of the female section member being extended inwards by a reentrant trough comprising a horizontal length extending from the end edge of the corresponding flange of the female section member, said horizontal length itself being extended by a reentrant wall disposed between the corresponding flange and flap of the male section member, said reentrant wall comprising a sloping length which extends at an angle towards the corresponding flange of the male section member and towards the end edge of said flange, said sloping length co-operating with the corresponding flap of the male section member to define a first ball race such that the balls of this ball race are in contact with said sloping length and with said flap of the male section member, whereas said flap of the male section member also co-operates with a corner zone situated at the junction between the web of the female section member and the corresponding flange of said female section member to define a second ball race in such a manner that the balls in the second ball race are in contact with said flap of the male section member and with said corner zone, wherein the balls of each first ball race press against the vertical end portion of the corresponding flap of the male section member, the sloping length of each reentrant trough of the female section member directly extending the horizontal length of said reentrant trough, the sloping length being planar.

10. A combination of a vehicle seat and two slideways, the seat mounted on the two slideways, each slideway comprising a "female" section member, a "male" section member engaged in the female section member in such a manner as to leave four longitudinal ball races between the two section members and groups of each of the balls being received in one of said races to enable relative longitudinal sliding between the two section members, the male section member being generally in the form of a narrow channel comprising, firstly, a substantially horizontal web and secondly two flanges each extending substantially vertically from the web to an end edge, said end edge of the flanges of the male section member being extended outwardly by flaps each having a vertical end portion, the female section member being generally in the form of a wide channel and comprising, firstly a substantially horizontal web adjacent the end edges of the flanges of the male section member, and secondly two flanges each extending substantially vertically in the opposite direction to the two flanges of the male section member from the web of the female section member to respective end edges, thereby enveloping the male section member, the end edge of each of the flanges of the female section member being extended inwards by a reentrant trough comprising a horizontal length extending from the end edge of the corresponding flange of the female section member, said horizontal length itself being extended by a reentrant wall disposed between the corresponding flange and flap of the male section member, said reentrant wall comprising a sloping length which extends at an angle towards the corresponding flange of the male section member and towards the end edge of said flange, said sloping length co-operating with the corresponding flap of the male section member to define a first ball race such that the balls of this ball race are in contact with said sloping length and with said flap of the male section member, whereas said flap of the male section member also co-operates with a corner zone situated at the junction between the web of the female section member and the corresponding flange of said female section member to define a second ball race in such a manner that the balls in the second ball race are in contact with said flap of the male section member and with said corner zone, wherein the balls of each first ball race press against the vertical end portion of the corresponding flap of the male section member, the sloping length of each reentrant trough of the female section member directly extending the horizontal length of said reentrant trough, the sloping length being planar, the male section member being secured to a reinforcing section member likewise being generally channel-shaped, said reinforcing section member comprising a substantially horizontal web secured to the web of the male section member, two flanges which extend substantially vertically from said web on either side of the flanges of the female section member, and two substantially horizontal lips each of which is situated beneath a portion of the web of the female section member, said seat further including a seat belt having at least one anchor point secured to said seat.

* * * * *